Oct. 9, 1962     C. W. BROWN     3,058,035
GROUND SENSING AND PROTECTIVE UNIT
Filed Oct. 26, 1959     2 Sheets-Sheet 1

INVENTOR
CHESTER W. BROWN
BY Dybvig and Jacox
HIS ATTORNEYS

Oct. 9, 1962    C. W. BROWN    3,058,035
GROUND SENSING AND PROTECTIVE UNIT
Filed Oct. 26, 1959    2 Sheets-Sheet 2

INVENTOR
CHESTER W. BROWN
BY Dybvig and Jacox
HIS ATTORNEYS

United States Patent Office 3,058,035
Patented Oct. 9, 1962

3,058,035
GROUND SENSING AND PROTECTIVE UNIT
Chester W. Brown, Folsomville, Ind.
(Old Central City Road, R.R. 1, Greenville, Ky.)
Filed Oct. 26, 1959, Ser. No. 848,681
11 Claims. (Cl. 317—22)

This invention relates to a ground sensing and protective unit. The invention relates more particularly to apparatus for sensing a ground fault in an electrical system. The invention relates still more particularly to apparatus for protection of personnel who may come in contact with elements of an electrical system or in contact with elements which are connected to the electrical system.

Machines, tools, and the like are used which are supplied with electrical energy which flows to the machine or tool in conductors in the form of lines, or cables or the like. If a defect should occur in a cable supplying electrical energy to a load or if a defect should occur in the electrical circuit within the load, such as a machine or other electrically operated tool, a circuit to ground may be established. Thus, a person who is in contact with the ground who comes in contact with the machine or in contact with the defective portion of the cable may have a considerable voltage applied across a portion of his body. Therefore, such a defect or fault may be very dangerous to personnel if the circuit remains energized with the fault condition existing.

Therefore, it is desirable to have means which automatically disconnects the circuit from the source of electrical energy when the total resistance of the circuit to ground, including the electrical apparatus connected to the circuit, becomes less than a given value. It is also desirable to have means by which the circuit is automatically reconnected to the source of electrical energy when the resistance to ground again becomes above a given value.

Such an apparatus is particularly of value in connection with electrical systems and equipment and machines which are used out of doors. For example, in the mining industry electrically operated machines and tools are used for drilling, pumping, cutting, etc. Electrical energy is usually supplied directly to such a machine by a cable which includes a plurality of conductors therewithin. Such cables and such machines and the operators thereof come in direct contact with the ground. Often work is done under wet or otherwise difficult conditions. The machines and the cables are subjected to hard, rugged usage. However, the cables and the machines must at all times be safe to be contacted by personnel.

An object of this invention is to provide apparatus which very adequately protects personnel by automatic disconnection of a circuit from a source of electrical energy if a dangerous fault condition exists.

It is another object of this invention to provide an apparatus which automatically reconnects the circuit to the source of electrical energy when the dangerous fault condition no longer exists.

Another object of this invention is to provide automatically operating apparatus which "fails safe" when an element of the unit fails to operate properly so that the apparatus disconnects the circuit from the source of electrical energy if a failure of the automatic apparatus occurs.

Another object of this invention is to provide a protective unit which may be used in connection with a circuit having no ground connection and no ground wire.

Another object is to provide such a protective unit which can be easily and quickly tested at any time.

Another object is to provide such a protective unit which has time delay means for connecting the circuit to the source of energy after the establishment of suitable conditions for the reconnection, thus providing further protection to personnel.

Another object of this invention is to provide a personnel protective unit which may be used in connection with single-phase circuits or multi-phase circuits.

Another object is to provide a protective unit for a three-phase circuit which unit prevents single-phase electrical energy supply to the load lines.

Another object of this invention is to provide such a protective apparatus which can be readily moved from one location to another as desired.

Another object of this invention is to provide such a protective unit which can be locked or sealed so that the apparatus cannot be rendered inoperative by a person who has no authority to do so.

Another object of this invention is to provide such a protective apparatus which can be sturdily built at relatively low costs.

Other objects and advantages reside in the construction of parts, the combination thereof, the method of manufacture, and the mode of operation, as will become more apparent from the following description.

Figure 1:
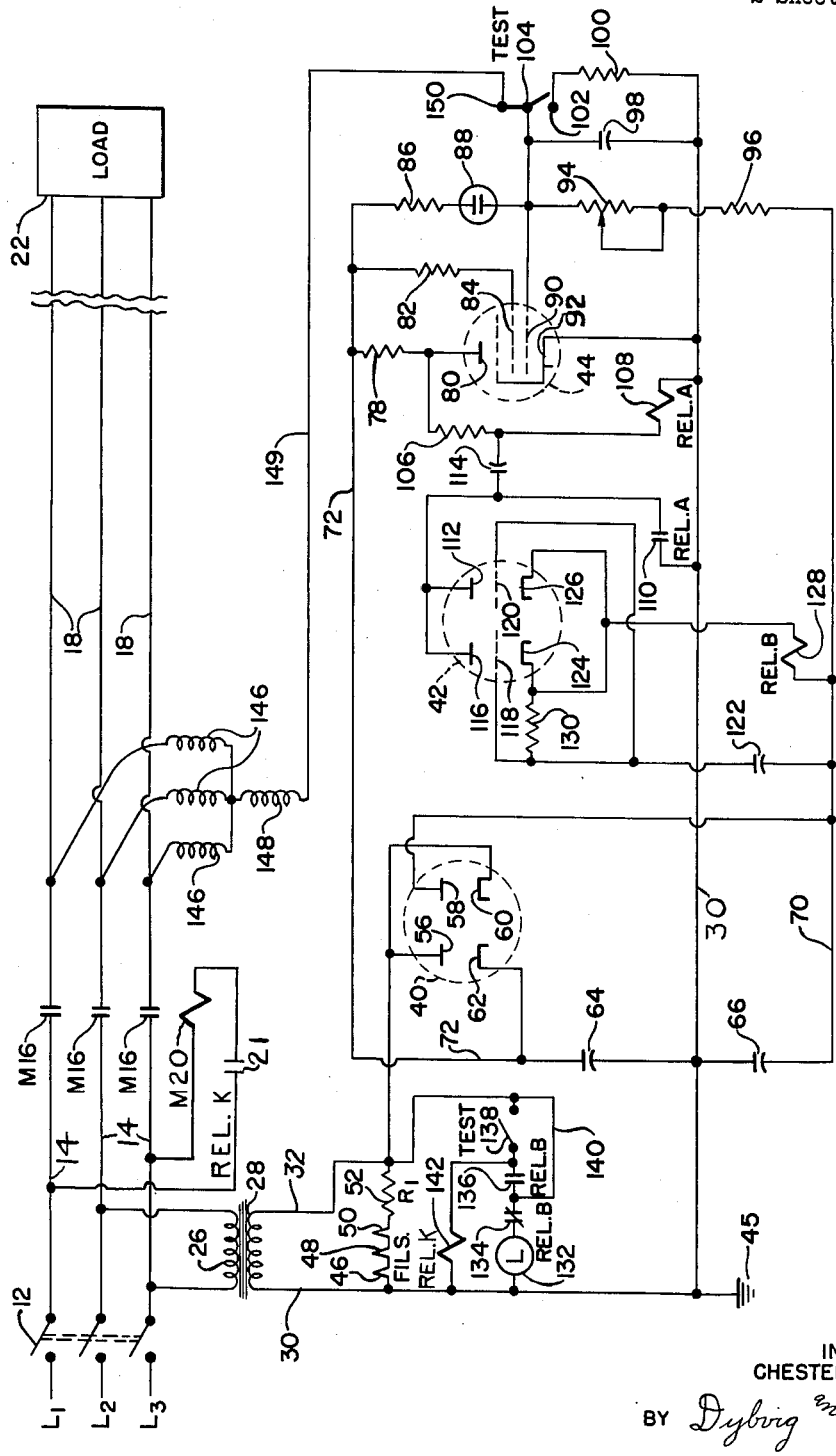
FIGURE 1 is a schematic diagram showing a ground sensing and protective unit of this invention.

Referring to the drawings in detail, FIGURE 1 shows a main switch 12, which is manually operated and which is used for connecting lines L1, L2, and L3 of a source of electrical energy to lines 14.

Electromagnetically operated main contactor switches M16 are used to connect the lines 14 to load lines 18. The lines 18 are connected to a load 22, which may consist of any suitable electrically operated device or devices.

The contactor switches M16 are closed by energization of an operating coil M20 which is in series with normally-open contacts 21 of a relay K. The series which consists of the operating coil M20 and the contacts 21 of the relay K is connected across the first and second lines 14.

Connected between the second and third lines 14 is a transformer primary winding 26 which is coupled to a secondary winding 28. Leads 30 and 32 extend from the secondary winding 28 to sensing and control circuitry which includes thermionic tubes or valves 40, 42, and 44. Filaments 46, 48, and 50 of the tubes 40, 42, and 44, respectively, are connected in series with a resistor 52 and attached across the lines 30 and 32. Thus, failure of the filament in one of the tubes causes all of the tubes to become non-conductive. The line 30 is grounded, as shown by reference numeral 45.

The tube 40 has anodes 56 and 58. The tube 40 is used to establish two direct current voltages, one voltage being positive with respect to ground and the other voltage being negative with respect to ground. The anode 56 is connected to the line 32. A cathode 62 of the tube 40 connects to the ground line 30. A capacitor 66 and the anode 58 of the tube 40 are connected to a line 70, which is referred to as a negative line due to the fact that the operating potential thereof is negative with respect to ground. A line 72 connects to the cathode 62 and is referred to as a positive line due to the fact that the operating potential thereof is positive with respect to ground.

A resistor 78 connects the positive line 72 on an anode 80 of the tube 44. A resistor 82 connects the positive line 72 to a screen grid 84 of the tube 44. A resistor 86 connects the positive line 72 to a voltage regulator tube 88 which, in turn, connects to a control grid 90 of the tube 44. A cathode 92 of the tube 44 is connected to the line 30, which as stated above, is at ground potential.

An adjustable resistor 94, in series with a resistor 96, connects the control grid 90 to the negative line 70. A capacitor 98 connects the control grid 90 to the grounded line 30. A resistor 100 is connected to the line 30 and to a post 102 of a single pole double throw switch 104. The central post of the switch 104 is connected to the control grid 90. The purpose of the switch 104 is discussed below.

A resistor 106 and an operating coil 108 are connected in series between the anode 80 of the tube 44 and the grounded line 30. The coil 108 is a part of a relay A which has a set of normally-open contacts 110 connecting the grounded line 30 to an anode 112 of the tube 42. Connecting the anode 112 to the resistor 106 is a capacitor 114.

The anode 112 of the tube 42 is connected to an anode 116 thereof. The tube 42 has control grids 118 and 120 which are connected together and which are joined to the negative line 70 through a capacitor 122. The tube 42 has cathodes 124 and 126 which are connected together and are joined to the negative line 70 through an operating coil 128 of a relay B. The cathodes 124 and 126 and the control grids 118 and 120 are joined together through a resistor 130. It is to be understood that a suitable tube having only one plate, one control grid, and one cathode may be used in place of the tube 42, as shown, which has a plurality of each of the elements.

Attached in series across the lines 30 and 32 is a signal light 132, a set of normally-closed contacts 134, a set of normally-open contacts 136 and a test switch 138. A jumper lead 140 connects the line 32 to the junction of the normally-open contacts 136 and the normally-closed contacts 134. The contacts 134 and 136 are part of the relay B and are operated by the operating coil 128. An operating coil 142 of the relay K is connected from the grounded line 30 to the test switch 138.

Connected to the power lines 18 are choke coils 146 or other suitable impedances to alternating current. The choke coils 146 are connected together in parallel and are joined to a choke 148. The choke 148 is connected by means of a lead 149 to a post 150 of the test switch 104.

*Operation of Apparatus Shown in FIGURE 1*

In order to provide electrical energy to the load 22, the manual switch 12 is closed. Thus, the transformer windings 26 and 28 are energized. The filaments 46, 48, and 50 of the tubes 40, 42, and 44 are thus energized. The test switch 138 is normally open, and the test switch 104 is normally closed to the post 150, as shown.

The grid 90 of the tube 44 is normally negative as a result of its connection to the line 70. Therefore, the tube 44 is normally non-conductive. Thus, direct current flow by-passes the tube 44 and flows through the resistors 78 and 106 and through the operating coil 108 of the relay A, energizing the operating coil 108 sufficiently to cause closing of the contacts 110. At the instant that the contacts 110 come into engagement for closing thereof, the capacitor 114 which is then connected directly to ground, discharges rapidly through the coil 108, causing a definite "snap-in" closing action of the contacts 110. Closing of the contacts 110 completes a circuit to the anodes 112 and 116 of the tube 42 so that current begins to flow through the tube 42. As a result of the action of the capacitors 122 and 66, the magnitude of the current is initially low, but gradually increases in value. After a time delay, there is sufficient flow of current drawn through the operating coil 128 to cause operation of the relay B. When this operation of relay B occurs, the contacts 134 open and the contacts 136 close. Closing of the contacts 136 causes energization of the operating coil 142 of the relay K so that the contacts 21 of the relay K are closed. Closing of the contacts 21 connects the main operating coil M20 directly across the first and second lines 14. This energizes the coil M20 which closes the contactor switches M16. Thus, the load 22 is energized.

When the current through the tube 42 was increasing, as discussed immediately above, following closing of the contacts 110, the voltage of the negative line 70 was being drawn more positive. During such action, the potential of the control grid 90 was slowly brought to a value close to the point at which it can cause "trip out" or deenergization of the load circuit.

The control grid 90 remains at the voltage just below its trip-out operating voltage as long as the resistance from the lines 18 to ground remains above a given predetermined value. However, during normal operation of the load 22, a defect or fault may occur so that a connection to ground exists, which decreases the resistance to ground below the given predetermined value. Such connection to ground may occur from one or more of the lines 18 directly to ground or the connection to ground may occur from one or more of the lines 18 through the load 22. When such decrease in resistance occurs and becomes less than the predetermined safe value, the control grid 90, through the lead 149 becomes sufficiently positive that there is considerable current flow through the tube 44. Due to the fact that the resistor 106 and the coil 108 form a by-pass circuit around the tube 44, the current through the coil 108 is dependent upon the current through the tube 44. When there is a high value of flow of current through the tube 44 the magnitude of current flow through the coil 108 becomes so small that the contacts 110 of the relay A cannot be held closed and thus contacts 110 open. When this opening occurs, the capacitor 114 is disconnected from the ground line 30 and instantaneously charges through the coil 108. This instantaneous charge of current flowing through the coil 108 causes a positive snap-open action of the contacts 110. Thus, the capacitor 114 prevents hunting action of the relay A.

When the contacts 110 open, the tube 42 ceases to conduct current therethrough and the coil 128 of the relay B is deenergized so that the contacts 134 thereof close and the contacts 136 open. When the contacts 136 open, the operating coil 142 of the relay K is deenergized, opening contacts 21 and causing deenergization of the main operating coil M20 so that the main contactor switches M16 open. Thus, electrical energy is removed from the lines 18 and from the load 22.

The test switch 104 may be operated by closing the circuit to the post 102 while opening the circuit to the post 150. This operation is used to calibrate the unit through the resistor 100, the value of which is selected to be one at which trip-out action should occur. Opening of the circuit to the post 150 also permits the circuits of lines 18 to be free and clear of the sensing devices so that certain tests on the lines 18 or in the sensing devices may be carried out. The test switch 138 may be closed for testing the closing of the contactor switches M16.

The contacts 134 of the relay B are arranged so that the light or lamp 132 is lighted when the switch 12 is closed and the contactors M16 are open. Thus, the lamp 132 when lighted indicates that there is a dangerously low resistance condition existing in the load circuits of the lines 18 and that the apparatus of the protective unit has deenergized the load lines 18.

The voltage regulator tube 88 and the elements connected thereto make possible satisfactory operation of the sensing and protective apparatus over a wide range of voltages supplied through the transformer windings 26 and 28. The tube 88 is preferably a neon tube and, in addition to serving as a regulator tube, may be used as an indicator that the unit has a "Power On" condition.

As a result of the action of the tube 42 in bringing the negative line 70 more positive when it is conducting, the operation of the apparatus is such that the main contactors M16 are opened when a given low value of resistance to ground occurs in the load lines but the contactors M16 are not closed until a somewhat higher value of resistance from the lines 18 to ground exists. Therefore, it is necessary for the ground fault condition to be well cleared before the lines 18 are again energized. This type of operation prevents hunting action of the unit and provides better protection to operating personnel. Thus, it is understood that if a person should accidentally come into contact with a defect in one of the lines 18, he may cause a ground fault which causes trip-out action of the unit. Due to the fact that there is a time delay in reclosing after a fault is cleared, such a person has sufficient time to leave the location of the defect before there is reenergization of the lines 18. Of course, such a defect in one of the lines 18 is usually repaired as soon as possible after such defect is known.

The sensing protective apparatus of this invention, as shown in FIGURE 1, is usually mounted in a housing which can be moved from place to place, as the need arises.

Figure 2:
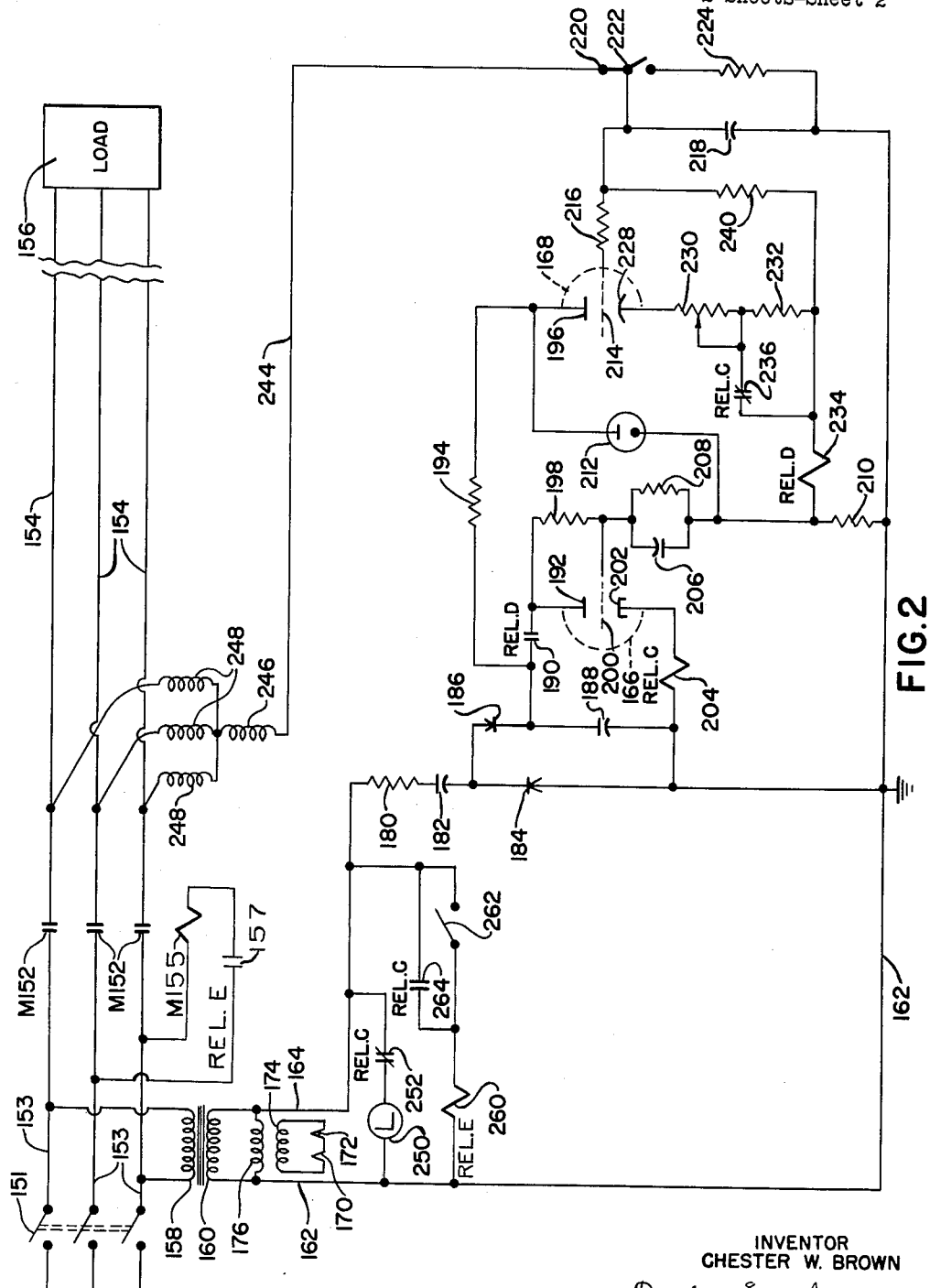
FIGURE 2 is a schematic diagram showing a modification of a ground sensing and protective unit of this invention.

Apparatus of FIGURE 2

A modification of a sensing and protective unit of this invention is shown in FIGURE 2. A main switch 151 and main contactor switches M152 are connected in power supply lines 153 and are similar to the main switch 12 and the main contactor switches M16 of FIGURE 1. Load lines 154 are connected from the contactor switches M152 to a load 156.

A main operating coil M155 is connected in series with normally-open contacts 157 of a relay E. The series is connected across the second and third power supply lines 153.

A control transformer 158 is connected across the first and third power supply lines 153. A secondary winding 160 of the transformer 158 has lines 162 and 164 which supply electrical energy to sensing and protective apparatus. The line 162 is grounded, as shown.

Electronic tubes 166 and 168 are used in this apparatus. As shown, the elements of the tubes 166 and 168 might be in a single tube or in two tubes. Filaments 170 and 172 are shown connected in series across a secondary winding 174 of a filament transformer 176 which is connected across lines 162 and 164.

A resistor 180, a capacitor 182, and a rectifier 184 are joined in series relation between the lines 162 and 164. A rectifier 186 and a capacitor 188 are connected in series and across the rectifier 184. Thus, a positive direct current voltage is available for connection to the tubes 166 and 168.

A pair of normally-open contacts 190 of a relay D connect an anode 192 of the tube 166 to the juncture of the rectifier 186 and the capacitor 188. A resistor 194 is connected from the contacts 190 to an anode 196 of the tube 168.

A resistor 198 joins the anode 192 to a control grid 200 of the tube 166. The tube 166 has a cathode 202 which is connected to an operating coil 204 of a relay C. The coil 204 is also connected to the ground line 162.

A parallel circuit of a capacitor 206 and a resistor 208 are connected in series with a resistor 210. The resistor 210 is joined to the ground line 162.

A voltage regulator tube 212 is connected between the anode 196 of the tube 168 and the resistor 210.

The tube 168 has a control grid 214 which has one end of a resistor 216 connected thereto. The other end of the resistor 216 is connected to a capacitor 218 and to a manually operable calibration switch 222 which is normally closed to a post 220. A resistor may be connected in parallel with the capacitor 218 by operation of the switch 222. The resistor 224 and the capacitor 218 are connected to the grounded line 162.

The tube 168 has a cathode 228 to which is connected an adjustable resistor 230. A resistor 232 joins the adjustable resistor 230 to an operating coil 234 of a relay D. A set of normally-closed contacts 236 are connected across the resistor 232. A resistor 240 is connected from the resistor 216 to the operating coil 234 of the relay D. The coil 234 is also connected to the resistor 210.

The post 220 of the switch 222 is connected to the load lines 154 by means of a conductor 244, and through chokes 246 and 248. Thus, the load lines 154 are, in effect, connected to the control grid 214 through the resistor 216.

Connected in series across the lines 162 and 164 is a lamp 250 and normally-closed contacts 252 of the relay C. Also, connected across the lines 162 and 164 are an operating coil 260 of the relay E which is in series with a switch 262. Connected across the switch 262 is a set of normally-open contacts 264 of the relay C. The operating coil 260 when energized, closes the contacts 157, which connects the main operating coil M155 to the supply lines 153, closing the main contactor switches M152 for energizing the load lines 154.

Operation of Apparatus Shown in FIGURE 2

When the switch 151 is closed, the transformer 158 is energized so that the lines 162 and 164 are energized. Thus, through the rectifiers 184 and 186, a direct current voltage is applied to the anode 196 of the tube 168. The control grid 214 and the cathode 228 are of such potentials that the tube 168 conducts current therethrough.

Current therefore flows through the operating coil 234 of the relay D. This current flow through the coil 234 causes the contacts 190 of the relay D to close so that a positive potential is applied to the anode 192 of the tube 166. The tube 166 thus conducts current therethrough so that current flows through the operating coil 204 of the relay C. When this current flow occurs, the contacts 252 are opened and the contacts 264 are closed. When the contacts 264 are closed the coil 260 of the relay E is energized so that the contacts 157 close, connecting the main operating coil M155 to the supply lines 153. This closes the main contactor switches M152, energizing the load lines 154 to the load 156.

It is to be noted that when the relay C is energized, the contacts 236 open. Thus, the resistor 232, which is normally shorted out, is placed in series with the adjustable resistor 230. Thus, the potential of the cathode 228 is made more positive and less current flows through the tube 168. The grid voltage required to stop current flow through the tube 168 is thus changed. The voltage of the grid 214 is thus close to the voltage of the grid 214 necessary for trip-out action of the unit. The tube 168 is thus said to be sensitized for tripping.

The control grid 214 senses the direct current voltage from the lines 154 to ground. If a ground fault should occur on one or more of the lines 154 so that a dangerous condition exists, the potential of the control grid 214 is made less positive so that current ceases to flow through the tube 168. When this occurs, no current flows through the operating coil 234 of the relay D and the contacts 190 open, stopping flow of current through the tube 166. The relay C is thus deenergized and the contacts 264 open, causing deenergization of the coil 260, opening of the contacts 157, deenergizing the coil M155 causing the main contactor switches M152 to open. Thus, the load lines 154 are deenergized and the lamp 250 is lighted.

It is to be noted that the contacts 236 close with deenergization of the relay C. The resistor 232 establishes the differential between the values of ground resistance required for energizing and deenergizing the load lines 154. Thus, the tube 168 will not again become conductive to reenergize the load lines 154 until the resistance to ground of the load lines 154 is a higher value than the resistance value at which the protective unit operated to deenergize the load lines 154. This assures good clearance of the ground fault and prevents hunting of the unit.

The switch 262 is used to test closing operation of the contactor switches M152. The switch 222 is used to calibrate the protective unit by inserting the resistor 224. The switch 222 also permits checks on the load lines 154 without the protective unit connected thereto.

It is to be noted that the circuits shown in both of the FIGURES 1 and 2, including the chokes, rectifiers, and other elements are such that only direct current can flow for voltage sensing by the control grids 90 and 214. Thus, a very high degree of accuracy and rate of response is possible.

In the use of a sensing and protective unit of this invention a load or load support structure for the load, is maintained in good electrical contact with the ground in order to best protect operating personnel.

In the use of a unit of this invention in connection with a three-phase circuit, as shown in FIGURES 1 and 2, protection is provided against the possibility of single-phase energy supply to the load lines. This protection is provided by the connection of each of the control transformers across two of the supply lines and the connection of each main operating coil across another pair of supply lines. Thus, if there is a failure of any portion of a three-phase power supply, the main contactor switches are opened.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. For control of energization of an alternating current electrical circuit, personnel protector apparatus comprising means establishing a direct current flow between the alternating current circuit and ground, electronic valve means sensing the direct current voltage between the alternating current circuit and ground, control means operated by the electronic valve means, the control means connecting the alternating current circuit to a source of electrical energy, the valve means causing the control means to connect the alternating current circuit to the source of electrical energy when the alternating current circuit has a voltage to ground which is greater than a given predetermined value, the valve means causing the control means to disconnect the alternating current circuit from the source of electrical energy when the alternating current circuit has a lesser given predetermined voltage to ground.

2. A unit for the protection of personnel who contact apparatus which is electrically energized by electrical energy supplied through a remotely extending alternating current electrical circuit comprising connector means for connecting the alternating current circuit to a source of electrical energy, conductor means permitting a flow of direct current between the alternating current circuit and ground, sensing means connected to the conductor means and detecting changes in the flow of current in the conductor means between the alternating current circuit and ground, said sensing means including an electronic tube having a control grid connected to said conductor means so that flow of current through the tube is dependent upon the flow of current in said conductor means, an operating coil connected to said tube so that the flow of current through the coil is dependent upon the conduction of current through said tube, circuit closing means operably connected to said operating coil for operation thereby in response to given values of flow of current through said conductor means.

3. Personnel protection apparatus for attachment to an alternating current electrical circuit having a plurality of lines and which provides electrical energy to a machine movable upon the ground comprising a contactor for connection of the alternating current circuit to a source of electrical energy, a plurality of choke coils, there being one choke coil connected to each line of the alternating current circuit, impedance means connecting the chokes to ground, sensing means, means providing direct current energy to the sensing means, the sensing means including thermionic valve means having a first control grid, the first control grid being connected to said impedance means, a first anode, a first cathode, a first operating coil, the first operating coil being connected to the first cathode so that the current flow through the first operating coil is dependent upon the current flow between said first cathode and said first anode, the current flow between said first cathode and said first anode being dependent upon the voltage of said first control grid, a second anode, a second control grid, and a second cathode, a source of positive voltage, switch means connected to said second anode for connecting said second anode to the source of positive voltage, said switch means being operably connected to said operating coil and closed with energization thereof, a second operating coil, the second operating coil being connected to the second cathode so that the flow of current through said second operating coil is dependent upon the flow of current between said second cathode and said second anode, means connecting the second control grid to ground, the second operating coil being connected to said contactor for operation thereof.

4. A sensing and protective unit for an alternating current electric circuit and machinery operated thereby comprising main switch means for connecting the alternating current electrical circuit to a source of electrical energy, alternating current impedance means connecting the circuit to ground, a first electronic valve, the first electronic valve having a first control grid connected to the impedance means, means providing a ground potential and a negative potential and a positive potential, the first valve having a cathode connected to the ground potential means, means connecting the first control grid to the negative potential, the first electronic tube having a first anode, means connecting the first anode to the positive potential, a first operating coil, means connecting the first operating coil between the first cathode and the first anode so that current flow through the first valve by-passes the first operating coil and current flowing through the first operating coil by-passes the first valve, a second electronic valve, the second electronic valve having a second anode, a second cathode, and a second control grid, means connecting the second anode to the first operating coil, first switch means, the first switch means connecting the second anode to ground potential, the first switch means being operable by the first operating coil, means connecting the second control grid to the negative potential, a second operating coil, the second operating coil joining the second cathode to the negative potential, and means operably connected to the second operating coil for operation of the main switch means.

5. A sensing and protective unit for an alternating current electric circuit comprising main switch means for connecting the alternating current circuit to a source of electrical energy, alternating current impedance means connecting the alternating current circuit to ground, a first electronic tube, the first electronic tube having a first control grid connected to the impedance means, means providing a ground potential and a negative potential and a positive potential, the first tube having a cathode connected to the ground potential, means connecting the first control grid to the negative potential, the first electronic tube having a first anode, means connecting the first anode to the positive potential, the first tube having a suppressor grid, means connecting the suppressor grid to the positive potential, a voltage regulator tube, means connecting the voltage regulator tube between the first control grid and the positive potential, a first operating coil, means connecting the first operating coil between the first cathode and the first anode so that current flow through the first tube by-passes the first operating coil and current flowing through the first operating coil by-passes the first tube, a second electronic tube, the second electronic tube having a second anode, a second cathode, and a second control grid, a capacitor connecting the second anode to the first operating coil, first switch means, the first switch means being operable by the first operating coil and connecting the second anode to ground potential, capacitor means connecting the second control grid to the negative potential, a second operating coil, the second operating coil joining the second cathode to the negative potential, and means operably connected to the second operating coil for operation of the main switch means.

6. Personnel protective means for an alternating current electrical circuit comprising main switch means connecting the alternating current circuit to a source of electrical energy, direct current conductor means connecting the alternating current circuit to ground and permitting flow of direct current between the ground and the circuit, a first electronic tube, the first electronic tube having a control grid connected to said means so that the control grid is sensitive to the flow of direct current between the circuit and ground, the control grid thus also being sensitive to the voltage between the circuit and ground, the first tube having a first cathode, resistor means, a first operating coil, the resistor means being connected in series between the first cathode and ground, a source of positive direct current voltage, the first tube having a first anode, means connecting the first anode to the source of positive voltage, a voltage regulator tube connected from the first anode to the first operating coil, first switch means, a second electronic tube, the second electronic tube having a second anode, first switch means, the first switch means being operable by the first operating coil and connecting the second anode to the source of positive voltage, the second tube having a second control grid, means connecting the second control grid to a portion of said resistor means, the second tube having a second cathode, means connecting the second cathode to ground, the last said means including a second operating coil, and means actuated by the second operating coil for operation of the main switch means.

7. Apparatus for control of energization of an ungrounded alternating current electrical circuit comprising electromagnetically operable switch means connecting the circuit to a source of electrical energy, a direct current sensing circuit detecting changes in voltage between the circuit and ground, the sensing circuit including a normally non-conductive electric discharge device having a cathode, an anode, and a control grid, means connecting the cathode to ground potential, means connecting the anode to a source of positive direct current potential, an operating coil, means connecting the operating coil to the anode and to the cathode of said device so that current flow through the coil is dependent upon current flow through the tube, means connecting the control grid to said circuit, and means operable by said operating coil for operation of said switch means.

8. Apparatus for an alternating current electrical circuit which supplies electrical energy to machinery comprising connector means connecting said alternating current circuit to a source of electrical energy, conductor means conducting direct current between said circuit and ground, sensing means connected to the conductor means and detecting the flow of direct current between the alternating current circuit and ground, the sensing means including an electronic tube having a control grid, the voltage of the control grid being dependent upon the amount of current flow between the circuit and ground, the tube having a cathode, an operating coil, resistor means connecting the operating coil between the cathode and ground, relay means operably connected to said operating coil for closing said connector means, and means operated by said relay means for shorting out a portion of said resistor means for sensitizing the tube.

9. A personnel protective unit for an electrical circuit, comprising connector means for connecting the circuit to a source of electrical energy, direct current sensing means connected between the circuit and ground, the sensing means detecting changes in direct current voltage between the circuit and the ground, the sensing means including an electronic device having a control member, the electronic tube having a cathode, means connecting the cathode to ground, actuating means operable in response to current flow through the tube for closing said connector means, and means operated by the actuating means and connected to said control member of the electronic device adjusting the sensitivity of the sensing means.

10. In a personnel protection unit for attachment to an alternating current electrical circuit, connector means for connecting the circuit to a source of electrical energy, control means controlling said connector means, said control means including detector means sensing the resistance between the circuit and ground, said detector means including direct current sensing means determining predetermined safe values of resistance and dangerous values of resistance between the circuit and ground, the detector means including time delay means for operation of the connector means to connect the circuit to a source of electrical energy following a time delay after the detector means has sensed that a safe resistance value exists between the circuit and ground, the detector means causing instantaneous operation of the connector means to disconnect the circuit from a source of energy when a dangerous resistance value between the circuit and ground occurs.

11. In a personnel protective unit for attachment to an alternating current circuit, a valve member, direct current conductor means connected to the circuit and to ground supplying a direct current voltage to the valve member, the current flow through the valve member being proportional to the value of said direct current voltage, and control means responsive to current flow through the valve member controlling the flow of current between the circuit and a source of electrical energy.

References Cited in the file of this patent

UNITED STATES PATENTS

| | | |
|---|---|---|
| 2,071,860 | Stoddard | Feb. 23, 1937 |
| 2,460,860 | Volpigno | Feb. 8, 1949 |
| 2,473,344 | McCown | June 14, 1949 |
| 2,691,747 | Griffin | Oct. 12, 1954 |
| 2,842,719 | Hurford | July 8, 1958 |
| 2,844,765 | Sosnoski | July 22, 1958 |

FOREIGN PATENTS

| | | |
|---|---|---|
| 805,456 | Great Britain | Dec. 3, 1959 |

OTHER REFERENCES

IBM "Electrical Shock Prevention Device," vol. 2, No. 2, August 1959.